(12) United States Patent  
Wang (10) Patent No.: US 10,592,010 B1  
(45) Date of Patent: Mar. 17, 2020

(54) ELECTRONIC DEVICE SYSTEM WITH INPUT TRACKING AND VISUAL OUTPUT

(71) Applicant: Apple Inc., Cupertino, CA (US)

(72) Inventor: Paul X. Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/832,018

(22) Filed: Dec. 5, 2017

Related U.S. Application Data (60) Provisional application No. 62/525,905, filed on Jun. 28, 2017.

(51) Int. Cl.
| | |
|---|---|
| *G09G 5/08* | (2006.01) |
| *G06F 3/0354* | (2013.01) |
| *G06F 3/042* | (2006.01) |
| *G06F 1/16* | (2006.01) |
| *G06F 3/041* | (2006.01) |

(52) U.S. Cl.
CPC .......... *G06F 3/03547* (2013.01); *G06F 1/169* (2013.01); *G06F 1/1686* (2013.01); *G06F 1/1694* (2013.01); *G06F 3/0416* (2013.01); *G06F 3/0426* (2013.01)

(58) Field of Classification Search
CPC .. G06F 3/03547; G06F 3/0416; G06F 1/1694; G06F 1/1686; G06F 3/0426; G06F 1/169
See application file for complete search history.

(56) References Cited

U.S. PATENT DOCUMENTS

| | | | |
|---|---|---|---|
| 5,528,263 A | 6/1996 | Platzker | |
| 6,520,647 B2 | 2/2003 | Raskar | |
| 6,728,632 B2 | 4/2004 | Medl | |
| 7,134,080 B2 | 11/2006 | Kjeldsen et al. | |
| 2006/0007142 A1 | 1/2006 | Wilson et al. | |
| 2008/0018591 A1* | 1/2008 | Pittel | G06F 1/1616 345/156 |
| 2010/0099464 A1* | 4/2010 | Kim | G06F 1/1615 455/566 |
| 2010/0199232 A1* | 8/2010 | Mistry | G06F 1/163 715/863 |
| 2012/0017147 A1* | 1/2012 | Mark | G06F 1/1639 715/702 |
| 2012/0026376 A1* | 2/2012 | Goran | H04N 9/3173 348/333.1 |
| 2015/0237704 A1 | 8/2015 | Siegel | |

* cited by examiner

*Primary Examiner* — Adam R. Giesy
(74) *Attorney, Agent, or Firm* — Treyz Law Group, P.C.; G. Victor Treyz; Kendall W. Abbasi (57) ABSTRACT

An electronic device such as a cellular telephone may be used to gather pointing input from a user. During operation, the electronic device may be held by a user. Orientation information such as information on an orientation of the electronic device relative to an external surface may be gathered using a camera, accelerometer, compass, gyroscope, or other orientation sensor. The gathered input may serve as pointing input for use in drawing visual elements such as lines in content being projected onto the external surface or content being displayed using displays. Pointing input and other input may also be used to select displayed items and take other actions. Displays for displaying image content may form part of an electronic device being held by the user, a desktop device, or other devices. A steerable projector may be used in displaying projected images such as images containing content based on pointing input.

21 Claims, 7 Drawing Sheets

ELECTRONIC DEVICE SYSTEM WITH INPUT TRACKING AND VISUAL OUTPUT

This application claims the benefit of provisional patent application No. 62/525,905, filed Jun. 28, 2017, which is hereby incorporated by reference herein in its entirety.

FIELD

This relates generally to electronic equipment, and, more particularly, to electronic equipment that gathers user input and that provides corresponding visual output.

BACKGROUND

Electronic devices such as cellular telephones and computers often include input devices such as keyboards, track pads, and mice. These input devices can gather user input. In some configurations, electronic devices may display visual output for a user. The visual output may, as an example, be displayed on a computer display or other display device.

Using arrangements such as these, a user may use an input device computer mouse to move an on-screen pointer. The user might move the pointer in a painting application to draw a line that follows a path taken by the on-screen pointer.

Arrangements such as these may be insufficiently flexible to accommodate diverse working environments and may be difficult for untrained users.

SUMMARY

An electronic device such as a cellular telephone or other device may be used to gather pointing input from a user. In some arrangements, the electronic device may be held by a user. The user may point the device at an external surface while moving the device. Orientation information such as information on an orientation of the electronic device relative to the external surface may be gathered using an orientation sensor. The orientation sensor may be a camera that captures images of the external surface that are processed to produce orientation information, an accelerometer, a compass, a gyroscope, or other orientation sensor. If desired, user pointing input may also be gathered by tracking movement of a user's finger or other external object across the external surface using a camera or other sensor.

User pointing input may be used in drawing visual elements such as lines, may be used to selecting items such as displayed items, etc. Images (e.g., an image containing a line or other visual element that has been drawn based on the pointing input, content that has been altered in other ways based on pointing input or other user input, etc.) may be displayed on a display. The display may form part of an electronic device that uses a sensor to gather user pointing input, an external display, or other equipment.

In some configurations, a projector may be used to project the image onto the external surface. The projector may be a steerable projector. Control circuitry in an electronic device may use an orientation sensor to gather information on the relative orientation between the electronic device and the external surface and can dynamically steer the steerable projector to compensate for movement between the electronic device and the external surface. The control circuitry can also update an image being projected by the steerable projector based on pointing input from a user such as pointing input gathered using the orientation sensor in the electronic device.

DETAILED DESCRIPTION

Electronic devices may be used in a system to gather input from a user and provide corresponding output. The input may be associated with captured motion of a user's body part such as a user's finger or other object (e.g., a stylus) and/or may be associated with movement of a cellular telephone or other portable electronic device that is being held and moved by a user and that is serving as an electronic pointing device. The output may include audio output, haptic output, and/or visual output. Examples in which output is provided visually are sometimes described herein as an example.

With one illustrative arrangement, pointing input (sometimes referred to as motion input) may be captured by tracking motion of a user's finger or other objects using a camera or other tracking device. The camera or other tracking device may be located in an electronic device that is being used to provide the user with visual output or may be part of another device.

In another illustrative arrangement, pointing input may be gathered using an inertial measurement unit or other components for gathering position and/or orientation information in an electronic device. For example, a user may point the housing of a handheld device such as a cellular telephone or other device at an external surface. While pointing the housing in this way, the user may press a button, touch sensor, or other component to indicate that the user is supplying pointing input. The user may then move the housing in desired directions while one or more sensors in the device (e.g., cameras, inertial measurement units, etc.) determine the direction in which the housing is being pointed.

In this way, the user may supply pointing input to the device that indicates where the device is being pointed relative to the external surface. A painting program or other software in the device may use the pointing input to generate a line corresponding to the movement of a cursor associated with the pointing input or to generate other content based on the pointing input. Corresponding visual output may be supplied using the same electronic device or using another electronic device. For example, an image may be projected onto the external surface that contains the line or other visual elements drawn based on the pointing input. Information on the relative orientation between the housing of a device that is gathering pointing input and the external surface may be used to adjust a steerable projector so that a projected image is projected onto the external surface from the device even as the relative orientation between the housing of the device and the external surface changes.

In systems with a single electronic device, the device can be used for gathering input (e.g., by tracking a user's finger or other object or by using the device as a pointing device) and for providing output (e.g., using a steerable projector). In systems with multiple devices, input gathering and visual output generation may be handled separately. For example, one device may be used as a pointing device or may track a user's finger movements while another device may have a projector or display for displaying output.

Figure 1:
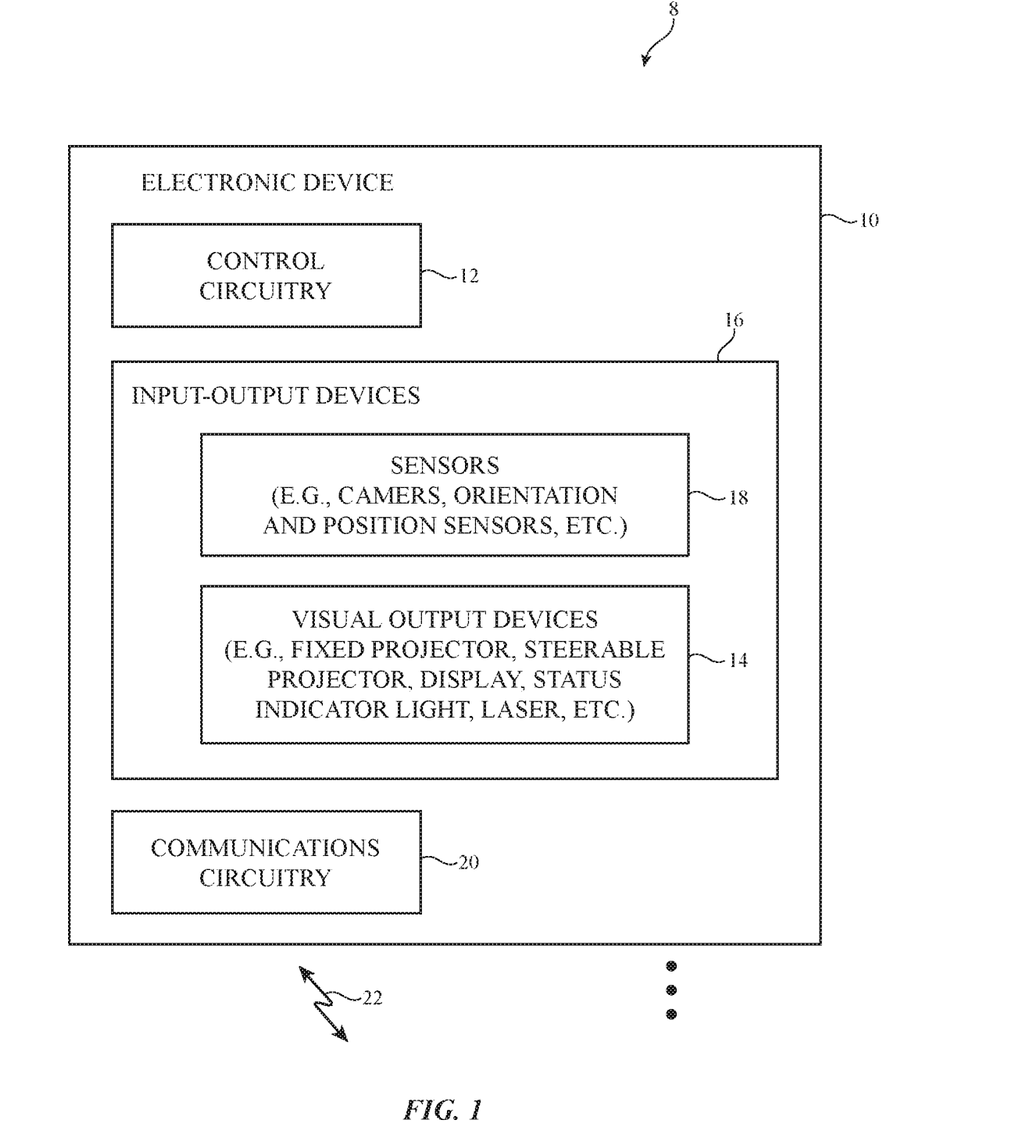
FIG. 1 is a schematic diagram of an illustrative system in accordance with an embodiment.

FIG. 1 is a schematic diagram of an illustrative system for gathering input and providing visual output. As shown in FIG. 1, system 8 may include one or more electronic device such as device 10. Device 10 of FIG. 1 may be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, a device embedded in eyeglasses or other equipment worn on a user's head, or other wearable or miniature device, a computer display that does not contain an embedded computer, a gaming device, a navigation device, an embedded system such as a system in which electronic equipment with a display is mounted in a kiosk or automobile, a remote control, a voice-controlled Internet-connected speaker (e.g., an artificial intelligence assistance device, home assistant, etc.), a set-top box, equipment that implements the functionality of two or more of these devices, or other electronic equipment.

As shown in FIG. 1, electronic device 10 may have control circuitry 12. Control circuitry 12 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 16 may be used to allow data to be supplied to device 10 and to allow data to be provided from device 10 to external devices. Input-output devices 16 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 16 and may receive status information and other output from device 10 using the output resources of input-output devices 16.

Input-output devices 12 may include sensors such as sensors 18. Sensors 18 may include, for example, digital image sensors in one or more cameras that can capture images of a user and/or the environment surrounding device 10. If desired, sensors 18 may include light detection and ranging (LIDAR) sensors for detecting outlines of objects and otherwise capturing information about the environment surrounding device 10, radio-frequency sensor circuitry (e.g., radio-frequency transmitters and receivers that can emit signals and detect reflected signals to detect outlines of objects and otherwise capture information about the environment surrounding device 10, ultrasonic sensors (e.g., ultrasonic transmitters that transmit ultrasound signals and microphones that detect corresponding reflected ultrasound signals to detect outlines of objects and otherwise capture information about the environment surrounding device 10, and/or other sensors that pick up the outlines of objects and environments. These sensors may detect how device 10 is oriented relative to the environment and objects and surfaces in the environment and can therefore provide information on device movements relative to objects and surfaces in the environment. Sensors 18 may also include other devices that can measure device motion and/or user movement. For example, sensors 18 may include inertial measurement units (e.g., accelerometers, gyroscopes, and/or compasses) that can make measurements of the position and/or orientation of device 10. The position and/or orientation of device 10 and/or external objects can also be tracked using ultrasonic sensors, light sensors (e.g., lidar, optical proximity sensors, three-dimensional image scanners, etc.), capacitance sensors (e.g., capacitance sensors that can measure distance), and/or other sensors.

Visual output can be provided using visual output devices 14. Visual output devices 14 may displays such as liquid crystal displays, organic light-emitting diode displays, and/or other displays and may form part of a computer monitor, television, laptop computer, tablet computer, cellular telephone, or other display device. Pixel arrays in these displays may have rows and columns of pixels for displaying images for a user.

Visual output can also be provided using fixed and/or steerable laser beams or other light sources that create beams of light, using status indicator lights (e.g., a status indicator based on a set of light-emitting diodes or a lamp), and/or other light-emitting components.

If desired, visual output devices 14 may include one or more projectors. Projectors, which may sometimes be referred to as image-projecting devices, may include lamps, light-emitting diodes, lasers, or other light sources and adjustable pixel arrays. Light from the light sources may be reflected from the adjustable pixel array to project a desired image onto a white board, table top, or other surface in the user's vicinity. The adjustable pixel arrays may be micro-electromechanical systems devices (sometimes referred to as digital light processing devices) that have arrays of adjustable micro-mirrors. Other types of pixel arrays (e.g., arrays based on liquid crystal display devices, liquid-crystal-on-silicon devices, etc.) may also be used if desired. In some configurations, rastered modulated laser beams (monochromatic and/or multicolor) may be used in projecting images.

A projector may emit image light in an image beam with a fixed direction or may have steerable components (e.g., steerable mirrors formed from metal, thin-film mirrors, and/or prisms, and/or other dynamically adjustable beam steering components) that allow the emitted image light beam to be emitted in an adjustable direction. In configurations in which devices 14 include a steerable projector, control circuitry 12 can dynamically control the direction of the emitted image from the projector by controlling the steerable mirrors or other steerable components in the steerable projector.

Communications circuitry 20 may include wired and wireless communications devices for supporting communications with other equipment in system 8. For example, communications circuitry 20 in one device 10 may be used to support communications over one or more wired or wireless communications links (e.g., link 22) with one or more devices 10 (e.g., a peer device, a host, an accessory, etc.). Wireless circuitry in communications circuitry 20 may include one or more antennas and one or more radio-frequency transceiver circuits. Wireless communications circuitry may be used to support wireless communications over cellular telephone bands, wireless local area network bands, near field communications bands, etc. For example, device 10 may be a cellular telephone and circuitry 20 may include wireless cellular telephone communications circuitry. Satellite navigation system receiver circuitry in circuitry 20 may be used to gather information such as location and speed information. Radar devices and/or other radio-frequency devices for gathering range and position information may be included in device 10, if desired.

Figure 2:
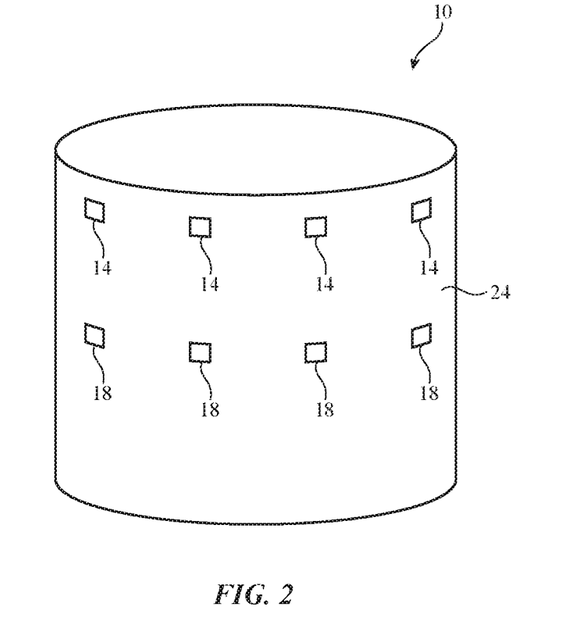
FIG. 2 is a perspective view of an illustrative electronic device in accordance with an embodiment.

A perspective view of an illustrative electronic device such as device 10 is shown in FIG. 2. As shown in FIG. 2, device 10 may include a housing such as housing 24. Housing 24, which may sometimes be referred to as a device body or enclosure, may be formed from one or more housing structures and may include materials such as plastic (polymer), metal, ceramic, glass, fabric, and/or other materials.

Electrical components such as sensors 18 and/or visual output devices 14 may be mounted on housing 24. As shown in FIG. 2, there may be multiple sensors 18 in device 10 and these sensors may be arranged to point in multiple directions. For example, sensors 18 may be arranged in a ring surrounding the periphery of housing 24, so that sensor data can be gathered from all sides of device 10. Visual output devices 14 may also be mounted in multiple locations around the periphery of housing 24, so that visual output such as projected images may be supplied on all sides of device 10. By distributing visual output devices 14 and sensors 18 over the surface of device 10, devices 14 and sensors 18 are less likely to be blocked by a user's hand and may accommodate a variety of device orientations and movements during operation. Housing 24 of device 10 in the illustrative configuration of FIG. 2 is cylindrical. Housing 24 may have other shapes (e.g., box shapes with rectangular outlines, etc.), if desired.

Figure 3:
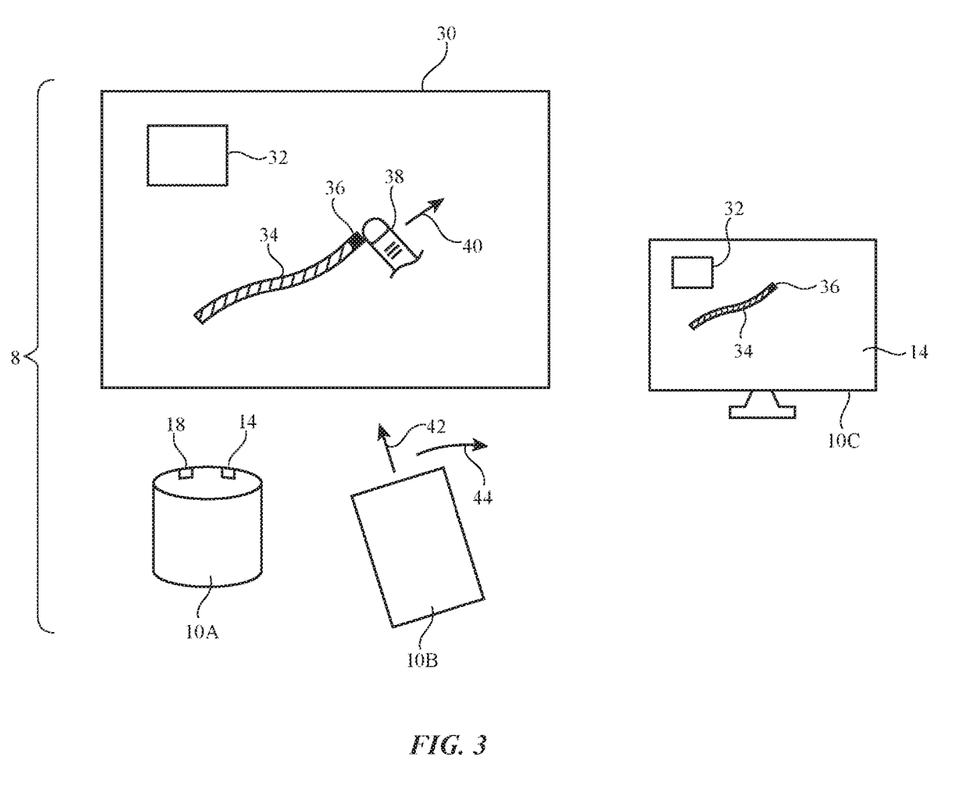
FIG. 3 is diagram showing how electronic devices may be used to gather input and supply corresponding visual output in accordance with an embodiment.

FIG. 3 is a diagram showing how system 8 may be used in gathering input and supplying corresponding visual output. There are three electronic devices 10 in the example of FIG. 3 (e.g., devices 10A, 10B, and 10C). These devices may communicate wirelessly (as an example). Device 10A may be a table top device such as a voice-controlled assistant (e.g., a voice-controlled internet-connected speaker) or other device, device 10B may be a cellular telephone or other device, and device 10C may be a computer or television or other device.

System 8 of FIG. 3 may be used with an input surface such as surface 30. Surface 30 may, for example, be a white board in an office, may be a wall, may be a piece of paper, may be a table top, or may be any other external surface.

Visual output devices 14 of device 10A may include a projector that projects an image onto an external surface such as surface 30. The displayed image may include content 32 (e.g., video content for a video call or movie clip and/or still image content such as photographs, text, graphics, etc.). The projected image on surface 30 may also include computer-generated content such as line 34 and cursor (pointer) 36.

During operation, device 10A may use sensors 18 to track user finger 38 or other external object that is being used as a pointer. The external object may be, for example, a stylus, a pointing stick, etc. Sensors 18 may include a camera or other tracking device that monitors the position and movement of finger 38 or other external object. As an external object such as user finger 38 is moved in direction 40 across surface 30, device 10A may take suitable action (e.g., updating displayed content, etc.). In response to detecting movement of finger 38 in direction 40, control circuitry 12 in device 10A may, for example, update the position of cursor 36 and may extend line 34 and/or may perform other tasks (e.g., by otherwise updating the image displayed using the projector). In general, device 10A may perform any suitable processing tasks in response to measured finger movement or other user pointing input. The use of finger movement to control software that is drawing a line on surface 30 is merely illustrative.

If desired, electronic device 10B may be used in gathering pointing input from the user. For example, the user may initially be orienting device 10B so that device 10B points in direction 42 at cursor 36. As the user moves device 10B in direction 44, sensors 18 in device 10B (e.g., an inertial measurement unit and/or camera, and/or other equipment for measuring position and orientation) may track the direction in which device 10 is pointing.

In response to detected user pointing input from movement of an external object such as user finger 38 and/or in response to movement of device 10B (which is being used as a pointing device), device 10A may update the projected image on surface 10. If desired, electronic devices without projectors may also update displayed images in response to these types of input. As an example, device 10C may be have a visual output device 14 such as a television screen, computer monitor, or other display. This display may be used in displaying an image with content 32. Image content such as illustrative line 34 and associated cursor 36 may also be displayed and may be updated on the display of device 10C in response to detection of movement of user finger 36 with the camera 18 in device 10A and/or motion of user device 10B. If desired, a device such as device 10B may store user pointing input (e.g., the control circuitry of device 10B may use an orientation sensor based on a camera, accelerometer and/or other inertial measurement unit components, etc. to track user pointing input as the user moves device 10B). The captured pointing input may later be used to display a drawn line or other content on a display in device 10B and/or to display this content on other devices (e.g., to display this content on the display of device 10C, to display this content on surface 30 using the projector in device 10A, etc.).

In arrangements in which device 10 includes a steerable projector, device 10 can gather pointing input by measuring the position and orientation of device 10 relative to surface 30 while simultaneously projecting an appropriate image onto surface 30.

Figure 4:
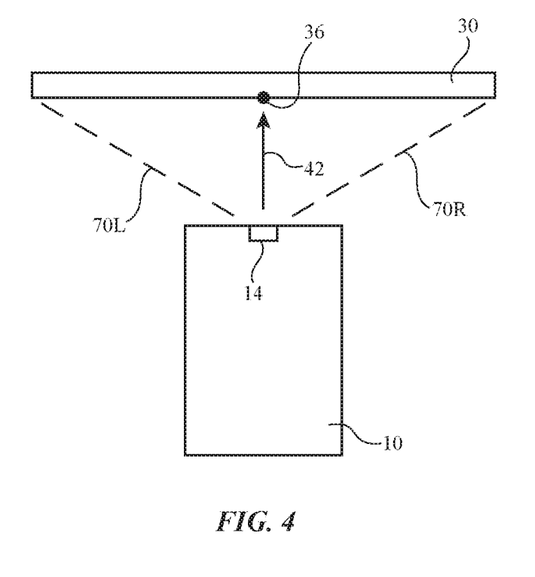
FIGS. 4 and 5 are diagrams showing how a device may use a steerable projector to display images while serving as an input device in accordance with an embodiment.
Figure 5:
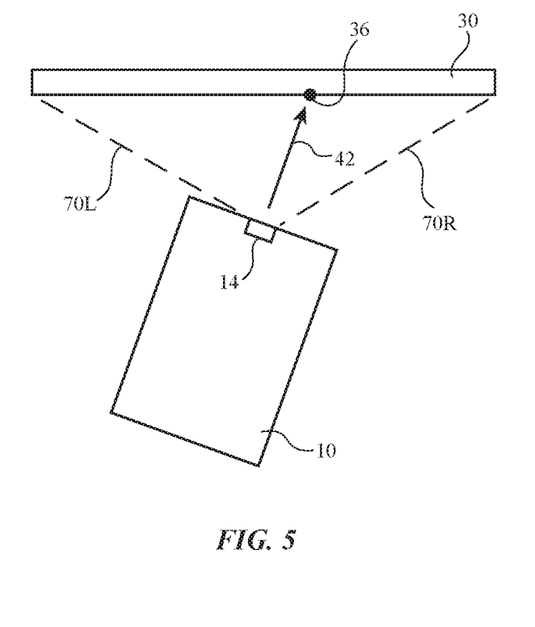

Consider, as an example, the arrangement of FIGS. 4 and 5. Initially, device 10 is pointed towards surface 30 in direction 42 of FIG. 4, so device 10 may project an image of cursor 36 in the center of surface 30. The projected image may be associated with a visual object such as line 34 of FIG. 3 (as an example). Control circuitry 12 may adjust the steerable projector in device 10 so that projected image light falls on surface 30, as illustrated by leftmost light ray 70L and rightmost light ray 70R of the projected image. Control circuitry 12 may use an orientation sensor in device 10 to gather information (user pointing input) on the relative orientation between the housing of device 10 and surface 30.

When the user desires to move cursor 36 (e.g. to extend the line being drawn in the image projected on surface 30), the user may rotate or otherwise move device 10 so that device 10 points in a new direction 42, as shown in FIG. 5. The orientation sensor(s) 18 may track the movement of device 10 (e.g., user pointing input), so that control circuitry 12 may update the position of cursor 36 and other visual items in the image being projected onto surface 30 accordingly. In addition, control circuitry 12 may adjust the steerable projector in device 10 to compensate for the movement of device 10. This ensures that the projected image light continues to fall on surface 30, as illustrated by the relatively unchanged positions of leftmost light ray 70L and rightmost light ray 70R at the left and right edges respectively of the projected image.

Figure 6:
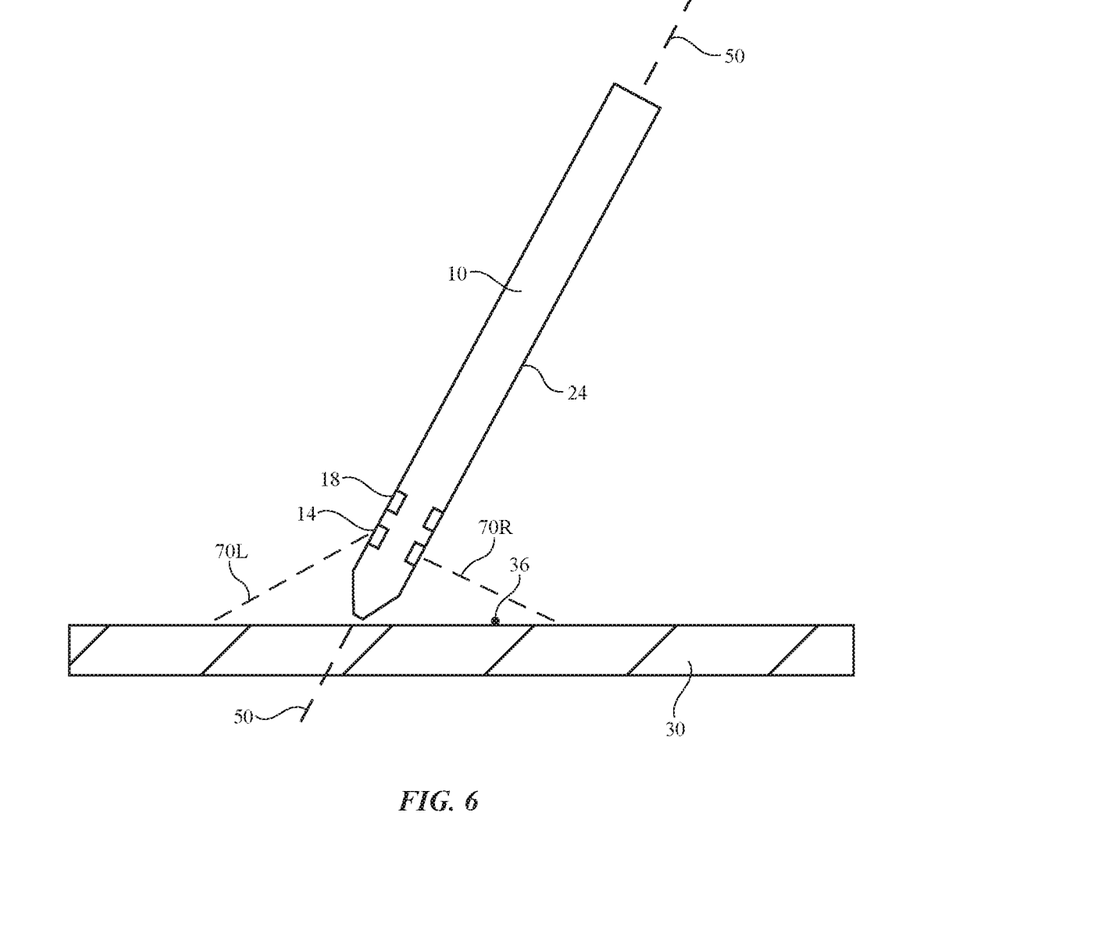
FIG. 6 is a cross-sectional side view of an illustrative stylus being use to gather input and provide visual output in accordance with an embodiment.

In the example of FIG. 6, device 10 is a stylus having an elongated body such as housing 24 that extends along longitudinal axis 50. One or more steerable projectors 14 and sensors 18 (e.g., cameras, etc.) may be arranged around the circumference of housing 24 as described in connection with FIG. 2. Sensors 18 may include lasers or other light-emitting devices that emit reference spots onto surface 30. Cameras in sensors 18 may detect the locations of the reference spots and may use triangulation to determine the position and orientation of device 10 relative to surface 30. As a user grips device 10 with the user's hand and uses device 10 to write or draw, sensors 18 (e.g., inertial measurement units, optical sensors such as lasers and associated cameras, or other position and orientation measurement devices) may be used to monitor the position of the tip of device 10 on surface 30 and may be used to update projected images from projectors 14. For example, if a user moves device 10 so that the tip of device 10 moves from point A to point B on surface 30, control circuitry 12 in device 10 can direct one or more projectors 14 in device 10 to update the projected image on surface 30 to include a line between point A and point B. While updating the projected image, control circuitry 12 can adjust the steerable projector(s) in device 10 to compensate for the movement of device 10. This ensures that the projected image light continues to fall on surface 30 (as illustrated by leftmost light ray 70L and rightmost light ray 70R at the left and right edges respectively of the projected image), even as device 10 changes in orientation relative to surface 30.

Figure 7:
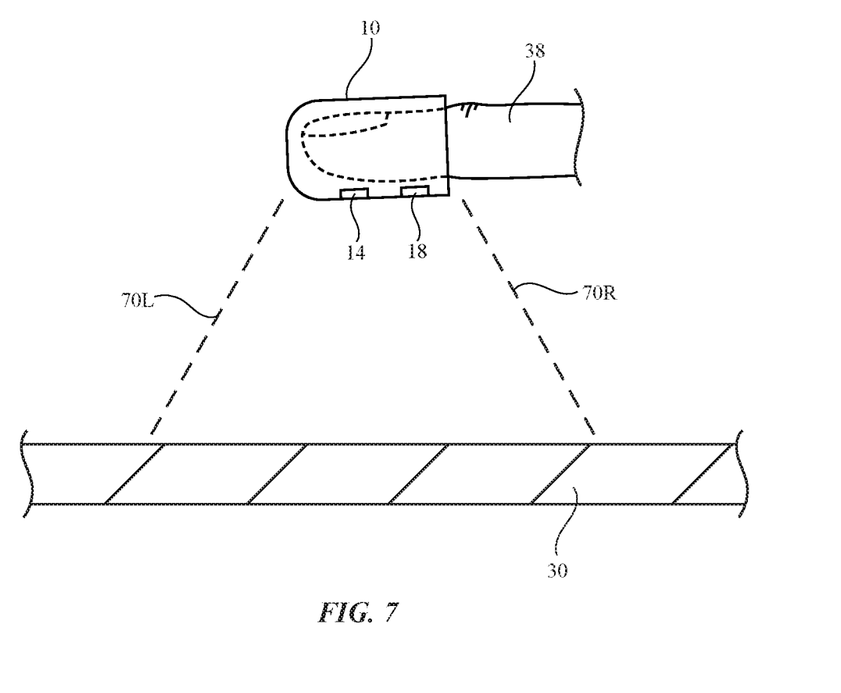
FIG. 7 a cross-sectional side view of a wearable device being used to gather input and provide visual output in accordance with an embodiment.

FIG. 7 shows how a wearable device (e.g., a wrist watch, finger-mounted device, glove, etc.) may be provided with sensors 18 and steerable projectors 14. This allows a user to provide pointing input by moving finger 38 and therefore device 10 relative to surface 30. Control circuitry 12 in wearable device 10 of FIG. 7 may update the projected image on surface 30 in response to the measured movement of finger 38 (e.g., to update a line being drawn in the image, etc.). As with the illustrative stylus arrangement of FIG. 6, control circuitry 12 of wearable device 10 of FIG. 7 may adjust the steerable projector(s) in device 10 to compensate for the movement of device 10 that is measured with sensor(s) 18. This ensures that the projected image light from projector(s) 14 in device 10 of FIG. 7 will continue to fall on surface 30 (as illustrated by left light ray 70L and right light ray 70R at the left and right edges respectively of the projected image), even as device 10 changes in orientation relative to surface 30.

Figure 8:
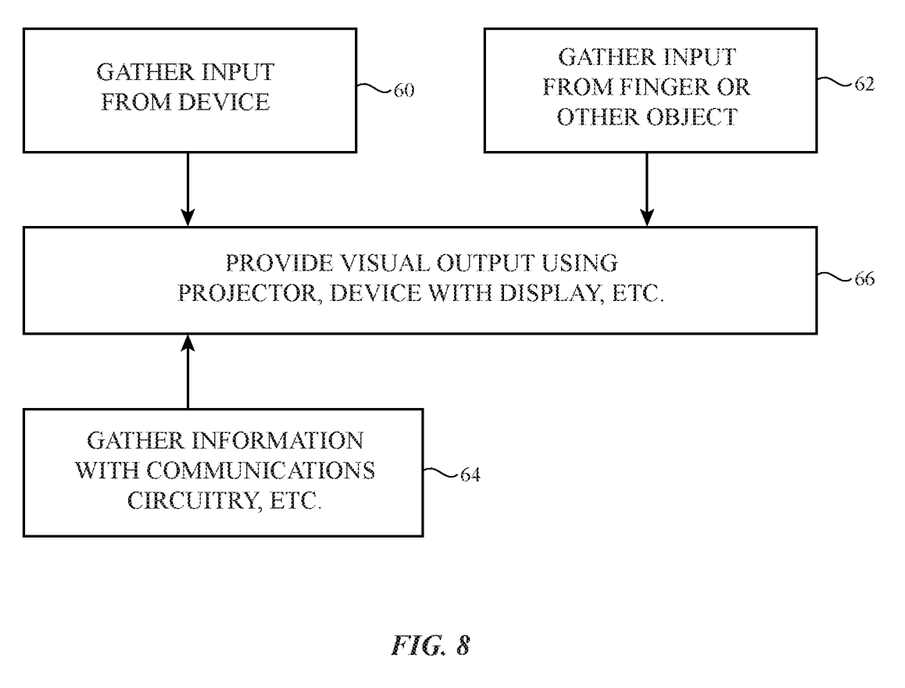
FIG. 8 is a flow chart of illustrative operations involved in using a system to gather input and provide visual output in accordance with an embodiment.

A flow chart of illustrative operations involved in using system 8 to gather user input and provide corresponding output is shown in FIG. 8.

During the operations of block 60, measurements may be gathered from sensors 18 to determine the position and/or orientation of device 10 relative to surface 30. For example, a camera (digital image sensor) may capture digital images and these images may be processed to determine the location of surface 30 relative to device 10. Registration marks or other features may be provided on surface 30 to determine the boundaries of surface 30. If desired, a user may be directed to place device 10 adjacent to one or more portions of surface 30 while data is gathered during block 60 to calibrate system 8. Calibration operations may also be performed by using a laser or other light-emitting component in device 10 to emit beams of light towards surface 30 while using sensors 18 (e.g., one or more cameras) to detect where the beams strike surface 30. If desired, this approach may be used during real time position and orientation sensing with sensors 18. Real time position and orientation sensing may also be performed using inertial measurement unit components, radio-frequency circuitry for detecting position and/or location, and/or other sensors 18.

During the operations of block 62, user input from a user's finger such as finger 38 or other external object may be gathered. For example, a camera or other image sensor in sensors 18 may capture images of a user's finger (or a ring or other device on the user's finger, a pointing stick, etc.) and may follow movement of the user's finger by processing the captured image data. User input may be gathered, for example, as a user's finger is moved relative to surface 30.

During the operations of block 64, multiple devices 10 in system 8 may exchange information and/or information may be obtained from other sources using communications circuitry 20 in each device. For example, a first device with a projector or other visual output device may receive user pointing information from a second device that is being used as a pointing device (e.g., by pointing at different objects in an image displayed on a display or projected on surface 30). Devices 10 may share information wirelessly (e.g., over a wireless local area network, via a cellular telephone connection(s) and the internet or other network, etc.).

During the operations of block 66, suitable action may be taken based on the information gathered during the operations of blocks 60, 62, and/or 64. As an example, a display such as display 14 of device 10C may present a dynamically updated image based on the gathered information, a display in device 10B (e.g., a pointing device) may be updated (e.g., based on captured user pointing input), and/or a projector such as projector 14 of device 10A of FIGS. 3, 4, 5, 6, and/or 7 may be used to present an updated image based on the gathered information.

In general, updated content in an image may be presented on a display in a device (e.g., device 10C) that is separate from a device being used to gather pointing input (e.g., device 10B) or a display in the same device that is being used to gather pointing input (e.g., a display in device 10B). A projected image may be presented using a device (e.g., device 10A) that is separate from a pointing device being used to gather pointing input (e.g., device 10B) or the same device (e.g., device 10A of FIG. 3 or device 10 of FIG. 4, 5, 6, or 7) may be used in gathering input (e.g., user pointing input from finger 38 and/or device position and orientation input from an inertial measurement unit or other sensor 18) and in providing projected images based on the gathered input.

The foregoing is merely illustrative and various modifications can be made to the described embodiments. The foregoing embodiments may be implemented individually or in any combination.

What is claimed is:

1. An electronic device, comprising:
   a housing having an orientation relative to an external surface;

a camera that tracks a position of a user's finger;
a steerable projector in the housing;
control circuitry configured to:
  gather information about the external surface;
  gather user input using the camera;
  project an image onto the external surface using the steerable projector, wherein the image contains content based on the position of the user's finger; and
  while projecting the image, steer the steerable projector so that the image is projected onto the external surface as the orientation of the housing relative to the external surface changes.

2. The electronic device defined in claim 1 further comprising a component that measures the orientation of the housing relative to the external surface.

3. The electronic device defined in claim 2 wherein the component includes the camera and wherein the camera captures images of the external surface.

4. The electronic device defined in claim 2 wherein the component comprises an orientation sensor.

5. The electronic device defined in claim 4 wherein the orientation sensor comprises an accelerometer.

6. The electronic device defined in claim 4 wherein the orientation sensor comprises an inertial measurement unit including an accelerometer and a gyroscope.

7. The electronic device defined in claim 2 wherein the control circuitry is configured to use the component to gather additional user input.

8. The electronic device defined in claim 7 wherein the component comprises an orientation sensor and wherein the additional user input comprises user pointing input associated with pointing the housing at the external surface.

9. The electronic device defined in claim 8 wherein the content comprises a line drawn based on the user pointing input and wherein the control circuitry is configured to project the line onto the external surface using the steerable projector.

10. The electronic device defined in claim 2 wherein the component comprises a sensor selected from the group consisting of: a light detection and ranging sensor, a radio-frequency sensor, and an ultrasonic sensor.

11. An electronic device, comprising:
  a housing;
  a projector in the housing that is configured to project an image onto an external surface;
  a sensor configured to gather user pointing input by measuring movement of a user's finger across the external surface; and
  control circuitry configured to:
    determine a location of the external surface; and
    update the projected image based on the user pointing input.

12. The electronic device defined in claim 11 wherein the projector comprises a steerable projector.

13. The electronic device defined in claim 11 wherein the sensor includes a digital image sensor.

14. The electronic device defined in claim 13 wherein the control circuitry is configured to gather additional user pointing input by processing an image of an external object captured with the digital image sensor to detect movement of the external object.

15. The electronic device defined in claim 11 wherein the control circuitry is configured to gather additional user pointing input using an orientation sensor selected from the group consisting of: an accelerometer, a gyroscope, and a compass.

16. The electronic device defined in claim 11 wherein the projected image that is updated includes a visual item updated based on the user pointing input gathered with the sensor.

17. The electronic device defined in claim 11 further comprising:
  a display; and
  wireless cellular telephone communications circuitry.

18. A method, comprising:
  displaying images; and
  with a cellular telephone, gathering user pointing input associated with an orientation of the cellular telephone relative to the images, wherein gathering user pointing input comprises measuring a movement of the cellular telephone; and
  updating content in the images to include user-drawn visual elements based on the user pointing input.

19. The method defined in claim 18 wherein:
  displaying the images comprises projecting the images onto an external surface with a projector; and
  gathering the user pointing input comprises gathering information on an orientation of the cellular telephone relative to the external surface with an orientation sensor in the cellular telephone.

20. The method defined in claim 19 displaying the images comprises displaying the images on a display in an electronic device that is separate from the cellular telephone.

21. The method defined in claim 19 wherein the user-drawn visual elements include a user-drawn line and wherein updating the content comprises displaying the user-drawn line based on changes in the orientation of the cellular telephone relative to the external surface.

* * * * *